(12) United States Patent
Seidl et al.

(10) Patent No.: US 11,835,041 B2
(45) Date of Patent: Dec. 5, 2023

(54) THIN MEMS PUMP WITH MEMBRANE AND VALVE LIP STRUCTURE

(71) Applicant: Infineon Technologies AG, Neubiberg (DE)

(72) Inventors: Martin Seidl, Moosburg a.d. Isar (DE); Alfons Dehe, Villingen Schwenningen (DE); Daniel Fruechtl, Regensburg (DE); Wolfgang Klein, Zorneding (DE); Ulrich Krumbein, Rosenheim (DE); Johann Strasser, Schierling (DE); Matthias Vobl, Munich (DE)

(73) Assignee: Infineon Technologies AG, Neubiberg (DE)

( * ) Notice: Subject to any disclaimer, the term of this patent is extended or adjusted under 35 U.S.C. 154(b) by 493 days.

(21) Appl. No.: 16/922,530

(22) Filed: Jul. 7, 2020

(65) Prior Publication Data
US 2021/0040942 A1 Feb. 11, 2021

(30) Foreign Application Priority Data
Aug. 6, 2019 (EP) .................... 19190302

(51) Int. Cl.
*F04B 53/10* (2006.01)
*F04B 43/04* (2006.01)
*F16K 99/00* (2006.01)

(52) U.S. Cl.
CPC ........ *F04B 53/1047* (2013.01); *F04B 43/046* (2013.01); *F16K 99/0015* (2013.01); *F16K 2099/0094* (2013.01)

(58) Field of Classification Search
CPC .... F04B 19/006; F04B 43/043; F04B 43/028; F04B 53/1047
See application file for complete search history.

(56) References Cited

U.S. PATENT DOCUMENTS

| | | | |
|---|---|---|---|
| 5,542,821 A * | 8/1996 | Dugan | F04B 43/043 |
| | | | 417/322 |
| 6,261,066 B1 | 7/2001 | Linnemann et al. | |

(Continued)

FOREIGN PATENT DOCUMENTS

| | | |
|---|---|---|
| CN | 101282789 A | 10/2008 |
| CN | 102797667 A | 11/2012 |

(Continued)

OTHER PUBLICATIONS

English Machine Translation of JP-10299659-A (Year: 1998).*

*Primary Examiner* — Nathan C Zollinger
(74) *Attorney, Agent, or Firm* — Slater Matsil, LLP

(57) ABSTRACT

A MEMS pump includes a basis structure, a membrane structure opposing the basis structure and being deflectable parallel to a surface normal of the basis structure and includes a pump chamber between the basis structure and the membrane structure wherein a volume of the pump chamber is based on a position of the membrane structure with respect to the basis structure. The MEMS pump includes a passage for letting a fluid pass into the pump chamber or exit the pump chamber, wherein the passage is arranged in-plane with respect to the pump chamber. The MEMS pump includes a valve structure coupled to the passage for connecting, in a first state, the passage to a first outer volume and for connecting, in a second state, the passage to a second outer volume.

13 Claims, 11 Drawing Sheets

(56) References Cited

U.S. PATENT DOCUMENTS

| | | | | |
|---|---|---|---|---|
| 7,309,902 B2* | 12/2007 | Reboa | ................... | B81B 3/0005 |
| | | | | 257/417 |
| 9,528,633 B2 | 12/2016 | Dos Santos et al. | | |
| 2013/0032210 A1 | 2/2013 | Johnstone et al. | | |
| 2019/0203703 A1* | 7/2019 | Shabanian | ............ | F04B 43/043 |

FOREIGN PATENT DOCUMENTS

| | | | | | |
|---|---|---|---|---|---|
| CN | 102884352 A | | 1/2013 | | |
| CN | 103206363 A | | 7/2013 | | |
| CN | 106151585 A | | 11/2016 | | |
| DE | 4402119 A1 | | 7/1995 | | |
| DE | 10238585 B3 | | 4/2004 | | |
| DE | 102008033153 A1 | | 1/2010 | | |
| JP | 10299659 A | * | 11/1998 | ............ | F04B 43/043 |
| JP | 2004291187 A | * | 10/2004 | | |
| WO | 2009034187 A1 | | 3/2009 | | |

\* cited by examiner

700

```
┌─────────────────────────────────────┐
│ Controlling the valve structure to open a first │
│ path to the first outer volume and to block     │──710
│ a second path to the second outer volume        │
└─────────────────────────────────────┘
                    │
┌─────────────────────────────────────┐
│ Providing a first pump control signal so as     │──720
│ to change a volume of the pump chamber          │
└─────────────────────────────────────┘
                    │
┌─────────────────────────────────────┐
│ Providing a second valve control signal to the  │
│ valve structure to control the valve structure to│
│ block the first path and to open the second     │──730
│ path after the volume of the pump chamber       │
│ has changed                                     │
└─────────────────────────────────────┘
                    │
┌─────────────────────────────────────┐
│ Providing a second pump control signal          │
│ so as to inversely change the volume of the     │──740
│ pump chamber                                    │
└─────────────────────────────────────┘
```

Fig. 7

THIN MEMS PUMP WITH MEMBRANE AND VALVE LIP STRUCTURE

This application claims the benefit of European Patent Application No. 19190302, filed on Aug. 6, 2019, which application is hereby incorporated herein by reference.

TECHNICAL FIELD

The present disclosure relates to a MEMS pump and to a method for operating a MEMS pump. The present disclosure further relates to a thin MEMS pump.

BACKGROUND

Pollution detection by cheap and/or mobile sensor systems is an upcoming topic. Pollutant and health harming gasses and/or particles can become harmful at even low concentrations. For detecting pollution, gas sensors may be used. Gas sensors mostly are driven by diffusion.

Micro pumps can enhance the transport of ambient fluid or air to the respective sensor systems. Micro pumps can increase a sampling rate and/or a precision of the measurement. Micro pumps may be a smaller and more cost economic compared to conventional state of the art pumps. Micro pumps may be integrated monolithically within other MEMS sensor systems.

SUMMARY

It is thus an object of embodiments to provide for an efficient MEMS pump and for a method for operating the same.

According to an embodiment, a MEMS pump that comprises a basis structure, a membrane structure opposing the basis structure and being deflectable parallel to a surface normal of the basis structure. The MEMS pump further comprises a pump chamber between the basis structure and the membrane structure, wherein a volume of the pump chamber is based on a position of the membrane structure with respect to the basis structure. The MEMS pump comprises a passage configured for letting a fluid pass into the pump chamber or exit the pump chamber, wherein the passage is arranged in-plane with respect to the pump chamber. The MEMS pump further comprises a valve structure fluidically coupled to the passage and configured for connecting, in a first state, the passage to a first outer volume so as to provide the fluid to the pump chamber and for connecting, in a second state, the passage to a second outer volume so as to provide the fluid to the second volume.

According to an embodiment, a method for operating a MEMS pump comprising a basis structure, a membrane structure opposing the basis structure and being deflectable along a direction towards the basis structure, comprising a pump chamber between the basis structure and the membrane structure, comprising a passage configured for letting a fluid pass into the pump chamber or exit the pump chamber and comprising a valve structure fluidically coupled to the passage and configured for connecting, in a first state, the passage to a first outer volume so as to provide the fluid to the pump chamber and for connecting, in a second state, the passage to a second outer volume so as to provide the fluid to the second outer volume. The method comprises controlling the valve structure to open a first path to the first outer volume and to block a second path to the second outer volume. The method further comprises providing a first pump control signal to the membrane structure so as to change a volume of the pump chamber. The method comprises providing a second valve control signal to the valve structure to control the valve structure to block the first path and to open the second path after the volume of the pump chamber has changed. The method further comprises providing a second pump control signal to the membrane structure so as to inversely change the volume of the pump chamber.

Further embodiments are defined in the dependent claims.

BRIEF DESCRIPTION OF THE DRAWINGS

Embodiments are described herein making reference to the dependent drawings, in which:

FIG. 3b shows a schematic top view of the MEMS pump of FIG. 3a;

FIG. 7 shows a schematic flow chart of a method according to an embodiment.

Figure 1:
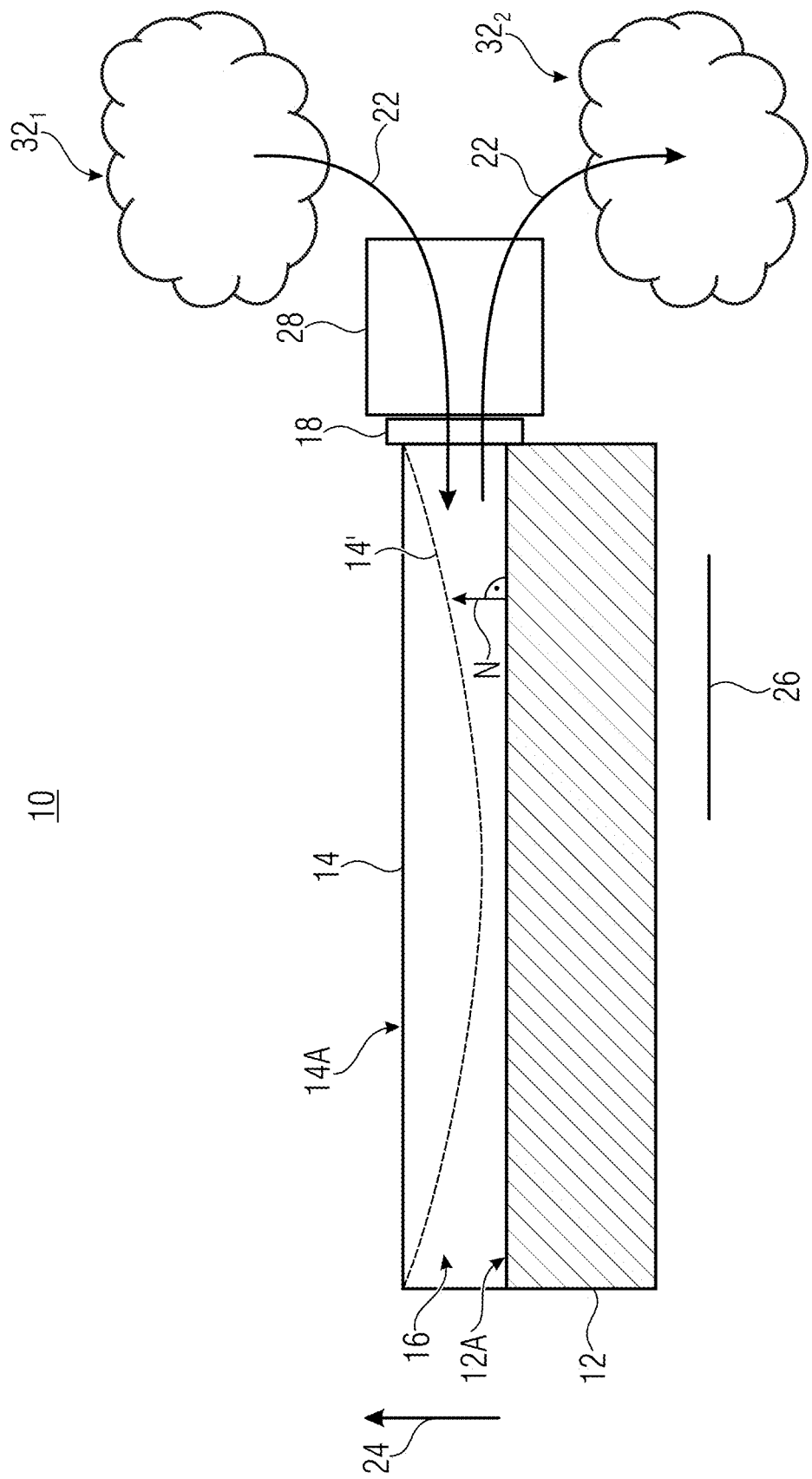
FIG. 1 shows a schematic block diagram of a MEMS pump according to an embodiment.

Equal or equivalent elements or elements with equal or equivalent functionality are denoted in the following description by equal or equivalent reference numerals even if occurring in different figures.

DETAILED DESCRIPTION OF ILLUSTRATIVE EMBODIMENTS

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to a MEMS (micro electro mechanical system) pump. MEMS may comprise a semi-conductor material, for example, a monocrystalline or polycrystalline semi-conductor material such as silicone or gallium arsenate. Elements of MEMS structures may comprise a single-layer or multi-layer configuration. For example, one or more paths may be formed from a semiconductor material or different materials such as a metal material or an oxide material or a nitride material. For example, one or more structures may comprise a semiconductor material which is covered, at least in part, with an insulating material such as a nitride material, e.g., silicone nitride or the like, and/or an oxide material, e.g., silicone oxide.

FIG. 1 shows a schematic block diagram of a MEMS pump 10 according to an embodiment. The MEMS pump 10 may comprise a basis structure 12, for example, a substrate. Although the basis structure 12 may be referred to as a substrate, this does not preclude the basis structure 12 to have mechanical and/or electrical functionalities being included in the basis structure 12. For example, an electrode structure may be arranged at the basis structure. Alternatively or in addition, circuit structures or the like may be arranged on or in the basis structure 12. The basis structure 12 may be referred to as a substrate.

The MEMS pump 10 comprises a membrane structure 14. The membrane structure 14 may comprise a semi-conductor material, for example, it may be formed so as to at least partially comprise a silicone material. Alternatively or in addition, a conductive structure or a conductive layer may be a part of the membrane structure 14. Alternatively or in addition, an insulating layer may be part of the membrane structure 14. For example, the membrane structure 14 may comprise a stack of layers having a semi-conductor layer that is doped so as to be conductive. That layer may be electrically connected so as to form an electrode structure. Such an electrode structure may be covered, at least partially, by an insulating layer. This may allow for an electrostatic actuation of the membrane structure. For example, as part of the basis structure 12 or at a different location, a further electrode may be arranged so as to allow for an electrostatic or electrodynamic actuation of the membrane 14. Alternatively or in addition, different driving concepts may be implementing, for example, a piezoelectric actuation. That is, the membrane structure 14 may comprise piezoelectric materials that allow for a deflection of the membrane structure 14 which is illustrated by way of non-limiting example only as a deflected membrane structure 14'. Although the deflected membrane structure 14' is illustrated as having a position closer to the basis structure 12 when compared to the unactuated or undeflected membrane structure 14, it is also possible to have the deflected membrane structure 14' as having a larger distance to the basis structure 12. Both configurations allow a pump chamber 16 being arranged between the basis structure 12 and the membrane structure 14 to have a variable or changed volume based on a position or deflection of the membrane structure 14. That is, a deflection or movement of the membrane structure 14 with respect to the basis structure 12 may allow for a variation of the volume of the pump chamber 16.

Although the membrane structure 14 is illustrated as having a shape being essentially parallel to the basis structure 12 in an unactuated state, thereby neglecting forces caused by gravity or the like, a different shape may be obtained for the possibly undeflected membrane structure 14 with regard to an actuation. For example, a biasing, mechanical pre-stress or the like may be implemented that shapes the membrane structure 14 to a different shape even if the membrane structure 14 is unactuated.

The membrane structure 14 may comprise at least a first state and a second state, wherein the volume of the pump chamber 16 is different between the first and the second state. For example, the membrane structure 14 may be actuated in one of the states and unactuated in the other state or may be actuated in both states.

The membrane structure 10 comprises a passage 18 configured for letting pass a fluid 22 into the pump chamber 16 or for letting the fluid 22 exit the pump chamber 16. For example, the passage 18 may be configured for both, i.e., for letting pass the fluid into the pump chamber 16, for example, during a first time interlope, and for letting the fluid exit the pump chamber 16, for example, during a second, different time interlope. The passage 18 is arranged in-plane with respect to the pump chamber 16. In-plane may be understood as having a same level or arrangement along a direction 24 which is parallel to a plane 26, the plane 26 being essentially parallel to a surface 12A of the basis structure 12 and/or a surface 14A of the membrane structure 14. The direction 24 or at least a component of a factor thereof may be arranged parallel to a surface normal N of the basis structure 12. The direction 24 may be understood as a thickness direction or a height direction such that the term in-plane may be understood as being arranged in the same thickness level or at the same hate, at least in parts. The plane 26 may thus be parallel to an extension of a wafer from which the MEMS pump 10 was made.

The MEMS pump 10 may comprise a valve structure 28. The valve structure 28 may be fluidically coupled to the passage 18 and thereby to the pump chamber 16. The valve structure 28 may be configured for connecting the passage 18 and/or the pump chamber 16 in different states to different outer volumes $32_1$ and $32_2$. Outer volume is to be understood in connection with the present embodiments so as to be outside the pump chamber 16. The outer volumes $32_1$ and $32_2$ may at least partially be located at different positions or regions which do not exclude the outer volumes $32_1$ and $32_2$ being fluidically coupled to each other. Although the MEMS pump 10 is described so as to have the valve structure 28 in a configuration to connect the passage 18 with two different outer volumes $32_1$ and $32_2$, embodiments may provide for configurations in which the valve structure 28 connects the passage 18 to more than two different outer volumes.

That is, in different states, positions or configurations or operating modes, the valve structure may connect the passage to different outer volumes. For example, in a first state the valve structure 28 may connect the passage 18 to the outer volume $32_1$ so as to provide the fluid 22 to the pump chamber. For example, during at least parts of the second state, the membrane structure 14 may move or deflect so as to increase the volume of the pump chamber 16, for example, when moving from the state of the deflected membrane structure 14' to the state of the membrane structure 14 such that the fluid 22 is sucked from the outer volume $32_1$ through the valve structure 28, through the passage 18 into the pump chamber 16. For example, in a second state, the valve structure 28 may connect the passage 18 to the outer volume $32_2$ so as to provide the fluid 22 to the outer volume $32_2$. For example, during a time interval that at least partially overlaps with a time interval in which the valve structure 28 is in the second state, the volume of the pump chamber 16 may be decreased, for example, when deflecting the membrane structure 14 into the configuration of the deflected membrane structure 14'. Thereby, at least parts of the fluid 22 may be pumped out from the pump chamber 16 into the outer volume $32_2$.

By arranging the passage 18 in-plane with respect to the pump chamber 16, a low thickness of the MEMS pump 10 may be obtained, i.e., a small extension along the thickness direction 24.

Figure 2:
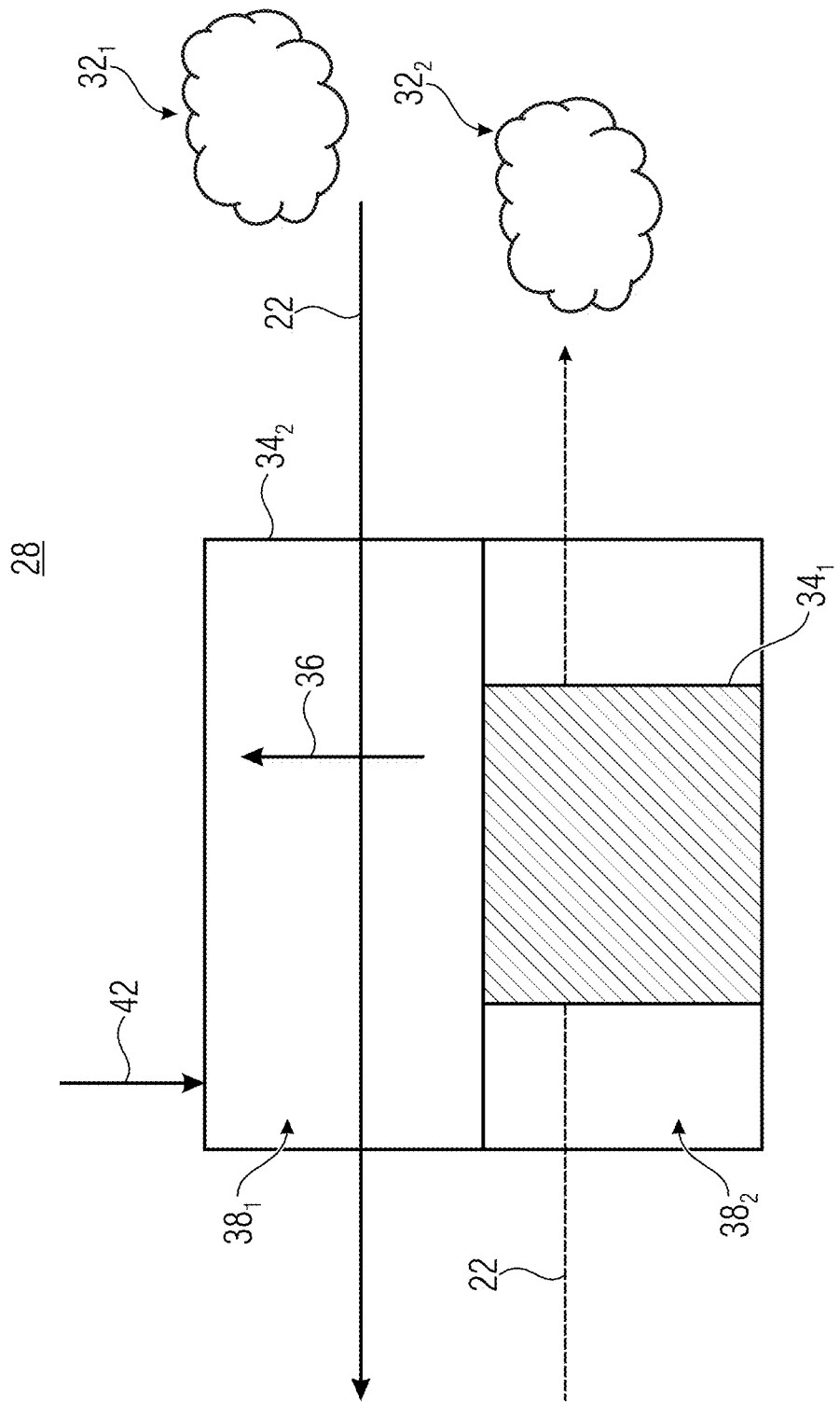
FIG. 2 shows a schematic side view of a valve structure being arranged in embodiments.

FIG. 2 shows a schematic side view of a possible implementation of the valve structure 28. The valve structure may comprise a portion $34_1$ and a portion $34_2$, i.e., elements of the valve structure 28. A relative position of the portions $34_1$ and $34_2$ may be variable. That is, at least one of the portions $34_1$ and $34_2$ is movable with respect to the other portion. For example, the portion $34_1$ is movable with respect to the portion $34_2$ along a moving direction 36. Alternatively or in addition, the portion $34_2$ may be movable with respect to the portion $34_1$. According to one example, the portion $34_2$ may form at least a part of a casing in which or relative to which the portion $34_1$ is movable.

In different states of the valve structure 28 the valve structure 28 is configured for intermittingly fluidically blocking a fluidic path $38_1$ or $38_2$ to the outer volume $32_1$, $32_2$ respectively. In the illustrated state the path $38_2$ is blocked, i.e., the passage 18 may let pass the fluid 22 from the outer volume $32_1$ as the valve structure 28 connects the passage to the outer volume $32_1$.

To change the state of the valve structure 28, the relative position between the portions $34_1$ and $34_2$ may be changed such that the path $38_1$ is blocked and the path $38_2$ is opened such that the pump chamber and the passage are connected to the outer volume $32_2$, thereby allowing the fluid 22 to travel from the pump chamber to the outer volume $32_2$.

A change between the different states may be obtained by use of a control signal 42, for example, an electric or optic signal that causes the valve structure 28 to change or maintain the relative position between the portions $34_1$ and $34_2$.

Although the valve structure 28 is illustrated as comprising two paths $38_1$ and $38_2$, embodiments are related to a valve structure that comprises a higher number of paths, for example, according to a number of outer volumes to which the pump chamber 16 has to be connected during an operation of the MEMS pump. In different states of the valve structure 28 there may be block at least one path. Alternatively or in addition, all paths except for one may be blocked in each of the operation states in which fluid 22 is allowed to travel through the valve structure 28.

Figure 3A:
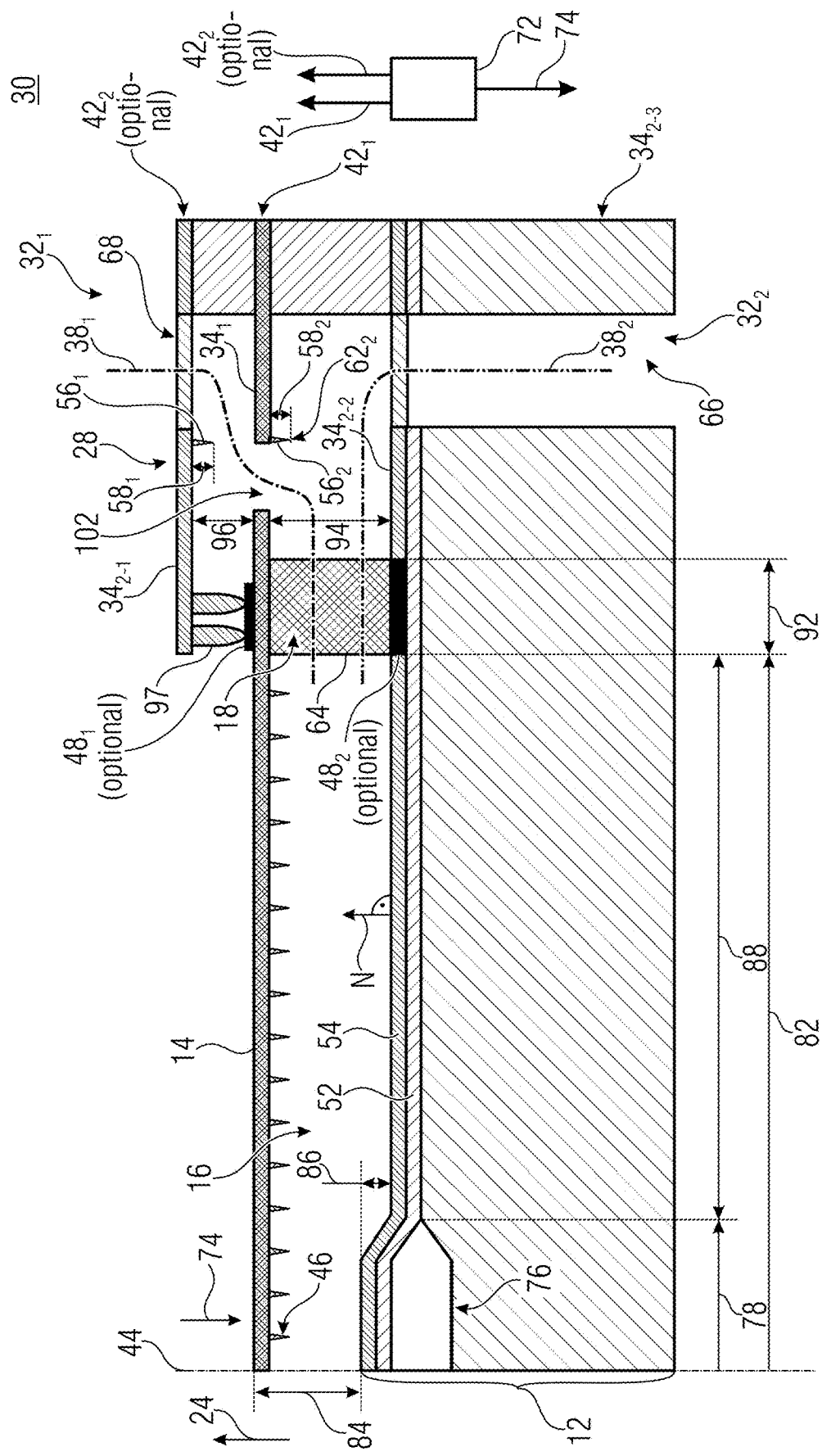
FIG. 3a shows a schematic side view of a MEMS pump according to an embodiment.

FIG. 3a shows a schematic side view of a MEMS pump 30 according to an embodiment. FIG. 3a shows only a part of the MEMS pump 30 which may be axial symmetric or rotationally symmetric with respect to an axis 44 which may be referred to as a center axis.

The membrane structure 14 may be arranged with a tension so as to have a straight membrane. The membrane structure 14 may be formed similar to a loud speaker membrane. For example, the membrane structure 14 may comprise anti-stiction bumps 46 that are adapted to prevent stiction to the basis structure 12 in case of a mechanical contact between the membrane structure 14 and the basis structure 12. The anti-stiction bumps 46 may alternatively be omitted at the membrane structure 14. Independent here from, anti-stiction bumps may also be arranged at the basis structure 12 so as to have anti-stiction bumps between the membrane structure 14 and the basis structure 12.

The membrane structure 14 may be moved or deflected towards or away from the basis structure 12 so as to change the volume of the pump chamber 16. The passage 18 is arranged in-plane with respect to the pump chamber 16. For example, the passage 18 may comprise one or more openings in a structure that fixes, holds or clamps the membrane structure 14 with respect to the basis structure 12. The valve structure 28 may be electrically insulated with respect to the membrane structure 14 by use of, for example, optional insulating layers $48_1$ and/or $48_2$. This may allow to apply electrically potentials and/or voltages to parts of the valve structure 28 whilst insulating those structures from the membrane structure 14.

For example, the portion $34_1$ may be deflectable with respect to the portion $34_2$. Alternatively or in addition, the portion $34_2$ may be deflectable. A deflection of the portion $34_1$ and/or $34_2$ may be obtained, for example, by use of an electrostatic force, a piezoelectric effect and/or an electrodynamic actuation.

For example, the portion $34_1$ may be formed of a same layer and/or material and/or structure when compared to the membrane structure 14. That is, the portion $34_1$ may be a prior part of the membrane structure 14 being separated from the membrane structure 14, for example, by etching holes, trenches or the like. The membrane structure 14 may comprise an electrode structure that allows to obtain an electrostatic force and/or an electrodynamic actuation when applying an electric potential with respect to an electrode structure 52 which may be arranged at the basis structure 12, wherein the electrode structure 52 may at least in parts be covered by an insulating layer 54. In the same manner, the portion $34_1$ may comprise an electrode structure or may be formed as an electrode structure. The portion $34_2$ may comprise at least in parts thereof a respective electrode structure which may be the same electrode structure 52 as for the membrane structure 14, for example, when using the electrode structure 52 as a source for a reference potential such as ground. Alternatively, the electrode structure 52 may be separated into different parts.

For example, by applying the control signal $42_1$ to the valve structure 28, e.g., to the portion $34_1$, a deflection of the portion $34_1$ may be obtained. Alternatively or in addition, a control signal $42_2$ may be applied to a part $34_{2\text{-}1}$ so as to deflect this part with respect to the portion $34_1$. By use of the control signal $42_1$ and/or $42_2$, intermittently one of the paths $38_1$ and $38_2$ may be block whilst the other is opened. Time intervals during which both parts $38_1$ and $38_2$ may be opened may be obtained, for example, during times during which the valve structure 28 changes its state. Such time intervals may be comparatively short when compared to the states during which one of the paths $38_1$ and $38_2$ is blocked.

As described, the portion $34_1$ may be arranged at least partially in a plane of the membrane structure 14. The portion $34_1$ may comprise a same material when compared to the membrane structure 14. Alternatively or in addition, the portion $34_2$ may be arranged at least partially in a same plane as the basis structure 12 as shown for the part $34_{2\text{-}3}$ of the portion $34_2$. The portion $34_2$ may comprise a same material when compared to the basis structure 12. That is, the portion $34_2$ may be formed from a same wafer or layer when compared to the basis structure 12 and/or from a same layer stack.

Between the portions $34_1$ and $34_2$ a lip structure $56_1$ and/or $56_2$ may be arranged. The lip structure may be formed as a circumferential anti-stiction bump that allows to tighten to seal a fluidic path when a butting at a respective different portion. For example, the portion $34_1$ may be moved towards the part $34_{2\text{-}1}$ of portion $34_2$ and/or the part $34_{2\text{-}1}$ may be deflected or moved towards the portion $34_1$ such that the lip structure $56_1$ may abut the portion $34_1$, thereby tighten or sealing path $38_1$. In a different state, the portion $34_1$ may be moved towards the part $34_{2\text{-}2}$ of portion $34_2$ such that the lip structure $56_2$ abuts the part $34_{2\text{-}2}$, thereby tightening the path $38_2$.

According to an embodiment, the MEMS pump 30 comprises no lip structure. According to a different embodiment, the lip structure $56_1$ and/or $56_2$ is arranged Part $34_{2\text{-}1}$ may be optional. However, in the configuration illustrated in FIG. 3a the portion $34_2$ comprises two or more parts. The portion $34_1$ is arranged between parts $34_{2\text{-}1}$ and $34_{2\text{-}2}$. The valve structure 28 is configured for alternatively connecting the portion $34_1$ with the part $34_{2\text{-}1}$ via the lip structure $56_1$ and, at different time intervals, with the part $34_{2\text{-}2}$ via the lip structure $56_2$.

The lip structure $56_1$ and/or $56_2$ may be formed as a circumferential anti-stiction bump that surrounds the pump chamber 16. That is, a height 56₁ and/or 58₂ (extension along the thickness direction 24), a broadness 62₂ perpendicular hereto may be same or comparable to a respective dimension of the anti-stiction bump 46. Different to anti-stiction bumps 46 which may be formed as a point-like structure, the lip structures 56₁ and/or 56₂ may be formed as a circumferential structure so as to form a lip. Accordingly, the valve structure 28 may surround the membrane structure 14 and/or the pump chamber 16.

The passage 18 may be formed, for example, as one or more spacings between pillar structure 64. For example, the pillar structures 64 may be arranged circumferentially and may be implements to space the membrane structure 14 from the basis structure 12 and for surrounding the pump chamber. That is, the passage 18 may be formed as such a circumferential structure comprising the plurality of pillar structures 64. Alternatively, for example, a porous structure may be arranged which, at the same time, allows for holding the membrane structure 14 and for letting pass the fluid 22.

The path 38₂ may lead to an exhaust 66 that directs the fluid 22 to the outer volume 32₂. In an alternative configuration, the exhaust 66 may also be an intake 68. One or more exhausts 66 may be arranged. The one or more exhaust 66 may be obtained, for example, by using a push process, i.e., they may be implemented as holes formed in the basis structure 12. The one or more exhausts 66 may be arranged around the central membrane.

As will be described in more detail in connection with, for example, FIGS. 4a-4f, a functionality of being an exhaust or an intake may be based on a timing of an actuation of the valve structure 28, i.e., which path 38₁ or 38₂ is blocked at a time in connection with a timing of an actuation or deflection of the membrane structure 14, i.e., whether it sucks the fluid 22 into the pump chamber 16 or leads the fluid 22 to exit the pump volume 16.

The MEMS pump 30 may comprise a control unit 74. The control unit 74 may be configured for generating, providing or transmitting the control signal 42₁ and optionally the control signal 42₂. Alternatively or in addition, the control unit 72 may be configured for providing, generating or transmitting a control signal 74 that allows to change the volume of the pump chamber 16, for example, by leading the membrane structure 14 to deflect.

The MEMS pump 30 may comprise a local tapering 76 in a center portion of the pump chamber 16, for example, arranged from the center axis 44 outwards for a distance 78 which may be, for example, at most 100 micrometers, at most 75 micrometers, or at most 50 micrometers. Alternatively or in addition, the distance 78 may be at most 20%, at most 15%, or at most 10% of a radial extension 82 of the pump chamber 16. The pump chamber 16 may have an in-plane extension, for example, a radius or an edge length being in-plane, i.e., perpendicular to the direction 24, of, for example, at least 50 micrometers and at most 2000 micrometers, at least 100 micrometers and at most 1500 micrometers, or of at least 200 micrometers and at most 1000 micrometers.

The local tapering 76 may comprise a local reduction of a distance 84 between the membrane structure 14 and the basis structure 12. For this, the local tapering 76 may comprise an extension 86, for example, a height or thickness parallel to the direction 24. The extension 86 may be, for example, at least 100 nanometers and at most 2500 nanometers, at least 200 nanometers and at most 2000 nanometers, or at least 400 nanometers and at most 1500 nanometers, or any other suitable value. The local reduction of the distance 84 allows to have the membrane 14 to first abut the basis structure 12 at the area of the local tapering 76 and then to move outwards towards the valve structure 28 and may thus allow for a highly effective pumping mechanism. For example, when using an electrostatic force between the electrode structures of the membrane structure 14 and the electrode structure 52, the electrostatic force may be higher in the area of the reduced distance. The local tapering 76 may thus produce towards the membrane structure 14 to locally reduce the distance 84 between the basis structure 12 and the membrane structure 14. Based on a deflection of the membrane structure 14 so as to reduce the volume of the pump chamber 16, a mechanical contact between the basis structure 12 and membrane structure 14 may first be obtained in the center portion and afterwards in a surrounding portion 88 that surrounds the center portion, for example, the region spanned by the distance 78. Alternatively or in addition, based on a deflection of the membrane structure 14 so as to increase the volume of the pump chamber 16, a mechanical contact between the basis structure 12 and the membrane structure 14 may first be released in the surrounding portion 88 and afterwards in the center portion.

The local tapering 76 may be implemented, for example, by a LOCOS (local oxidation of silicone) process. Thereby, a plateau in the center of the bottom backplate or basis structure may be created to support the actuation.

An extension or spacing 96 may be obtained via pillar like to ridge like structures 97 which may be arranged in a tangential manner, i.e., they may form tangential ridge-like structures, for example, using a semi-conductor material. A contact may be generated via the insulating structures 48₁ that may act as nitride landing pads as described for the insulating structures 48₂.

One or more pillar structures 64 may comprise a radial extension 92, i.e., an in-plane extension outwards from the center axis 44 being, for example, at least 5 micrometers and at most 50 micrometers, at least 10 micrometers and at most 40 micrometers or at least 15 micrometers and at most 30 micrometers, for example, 20 micrometers. An extension 94 of the pillar structure 64, e.g., a height or other extension parallel to the direction 24 may be, for example, at least 1 micrometer and at most 10 micrometers, at least 1.5 micrometers and at most 7 micrometers or at least 2 micrometer and at most 5 micrometer, e.g., 3 micrometer or any other suitable value. A distance 96 between the part 34₂₋₁ and the portion 34₁ may be based on a manufacturing technology and may be, for example, at least 0.1 micrometer and at most 5 micrometer, at least 0.5 micrometer and at most 4 micrometer or at least 0.7 micrometer and at most 2 micrometer, for example, 1 micrometer. Extensions 94 and 96 may be same or equal with regard to each other. In the illustrated configuration according to which the membrane structure 14 may be actuated by use of a single backplate structure, a design criteria may be to have a large distance between the basis structure 12 and the membrane structure 14 to have a large volume of the pump chamber 16. According to other configurations, for example, a dual-backplate configuration having a further electrode structure arranged such that the membrane structure 14 is arranged between two electrode structures, a large pump volume may be obtained by moving the membrane structure 14 into two opposing directions. This may allow to have a smaller extension 94 and/or a larger extension 96 when compared to each other and/or as absolute values.

Figure 3B:
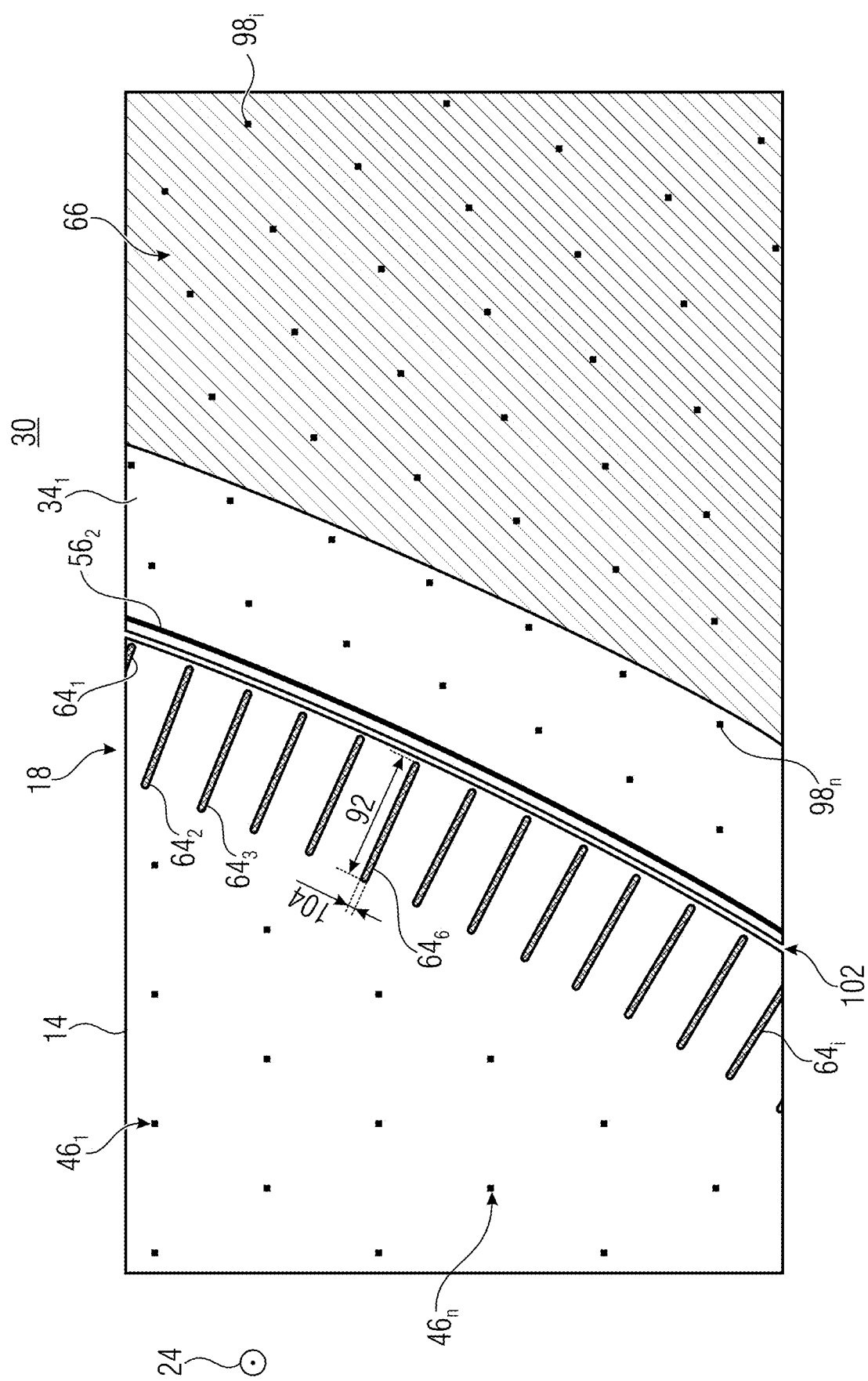

FIG. 3b shows a schematic top view of the MEMS pump 30 in a configuration in which some parts are transparent and/or missing. For example, the part 34₂₋₁ is missing, whilst the portion $34_1$ is transparent so as to allow to display the underlying exhaust 66. The part $34_1$ may comprise anti-stiction bumps $98_1$ to $98_j$ that may be formed, for example, equal or different when compared to the anti-stiction bumps 46. As may be seen, a gap 102 being also illustrated in FIG. 3a is arranged between the membrane structure 14 and the portion $34_1$.

The pillar structure 64 may be designed or implemented so as to allow for a high through put of the fluid 22 in one or two directions whilst, at the same time, allow for a high robustness with regard to supporting or underpinning the membrane structure 14 with respect to the basis structure 12. For example, the extension 92 may be comparatively high when compared to an extension 104 of the pillar structure 64, the extension 104 being perpendicular to the extension 92 and perpendicular to the direction 24. For example, the extension 104 may be referred to as a broadness. The extension 104 may be, for example, at least 100 micrometer and at most 2 micrometer, at least 200 micrometer and at most 1.7 micrometer or at least 0.5 micrometer and at most 1.5 micrometer, for example, 1 micrometer. This allows to block a low amount of the passage 18 in a radial direction whilst, based on the extension 92, a high stability may be obtained. The pillar structure 64 may be referred to as tangential ridge-like structures. The pillar structures 64 may be formed, for example, using a nitride material and may be referred to as nitride landing pads. Alternatively, other insulating, conductive or semi-conductive materials may be used. Although the lip structure $56_2$ may be a single, integral structure, the lip structure $56_2$ may also be formed as multiple parts.

FIGS. 4a-4f show schematic side views of the MEMS pump 30 in different states of actuation. In a first state being shown in FIG. 4a, the control unit 72 is configured for providing the control signal 42b so as to block the fluidic path $38_1$. In parallel, the control unit 72 is configured for providing the control signal 74b to the membrane structure 14 so as to have a low volume of the pump chamber 16, for example, a minimum volume. That is, the control unit 72 is configured for controlling the valve structure 28 so as to block the fluidic path $38_1$ whilst the fluidic path $38_2$ may be unblocked.

Figure 4A:
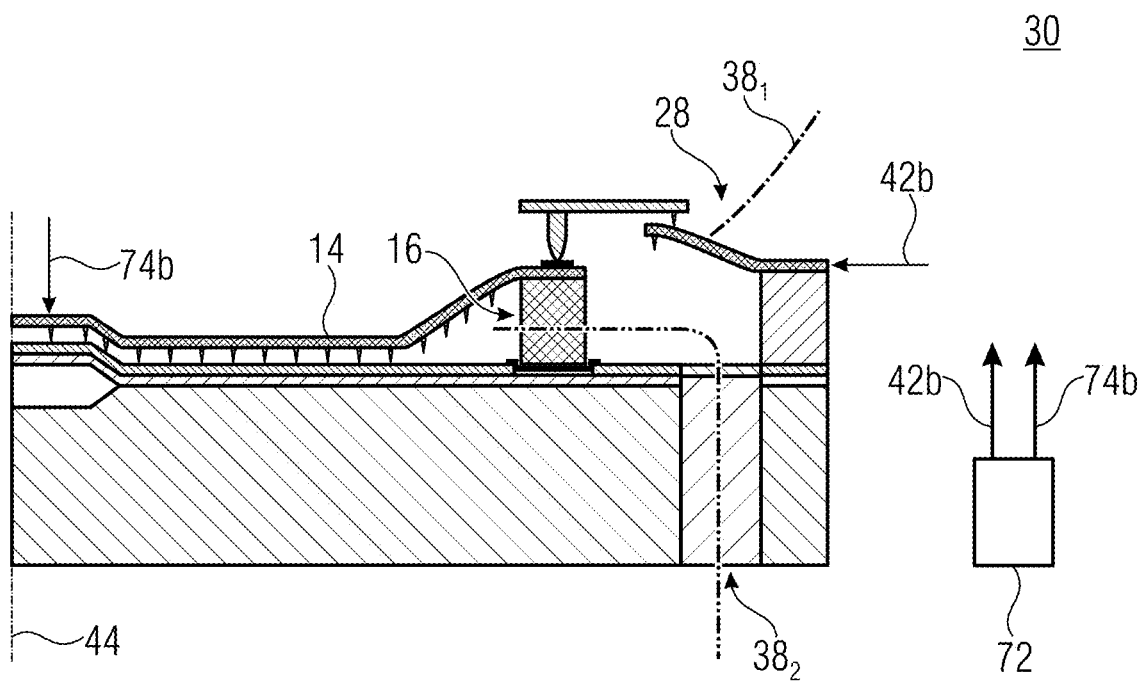
FIGS. 4a-4f show schematic side views of the MEMS pump of FIG. 3a in different states of actuation.
Figure 4B:
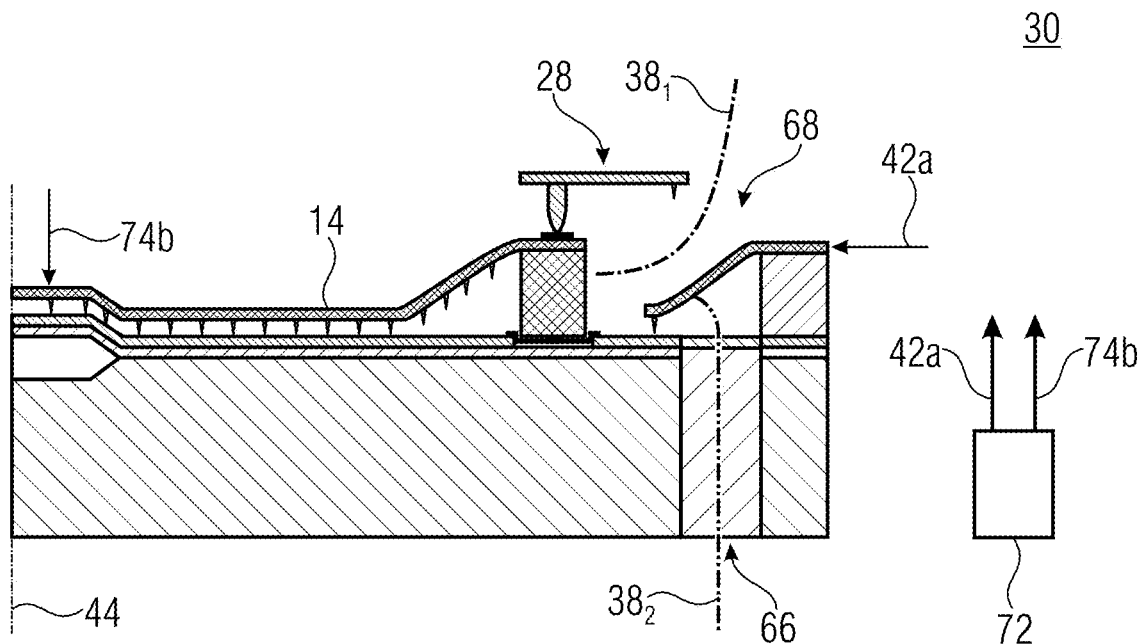

In a following or subsequent state being shown in FIG. 4b the control unit 72 may be configured for maintaining the control of the membrane structure 14 whilst providing the control signal 42a to the valve structure 28 so as to unblock the fluidic path $38_1$ and to block the fluidic path $38_2$. This may be referred to as closing the exhaust 66 and to open the intake 68.

Figure 4C:
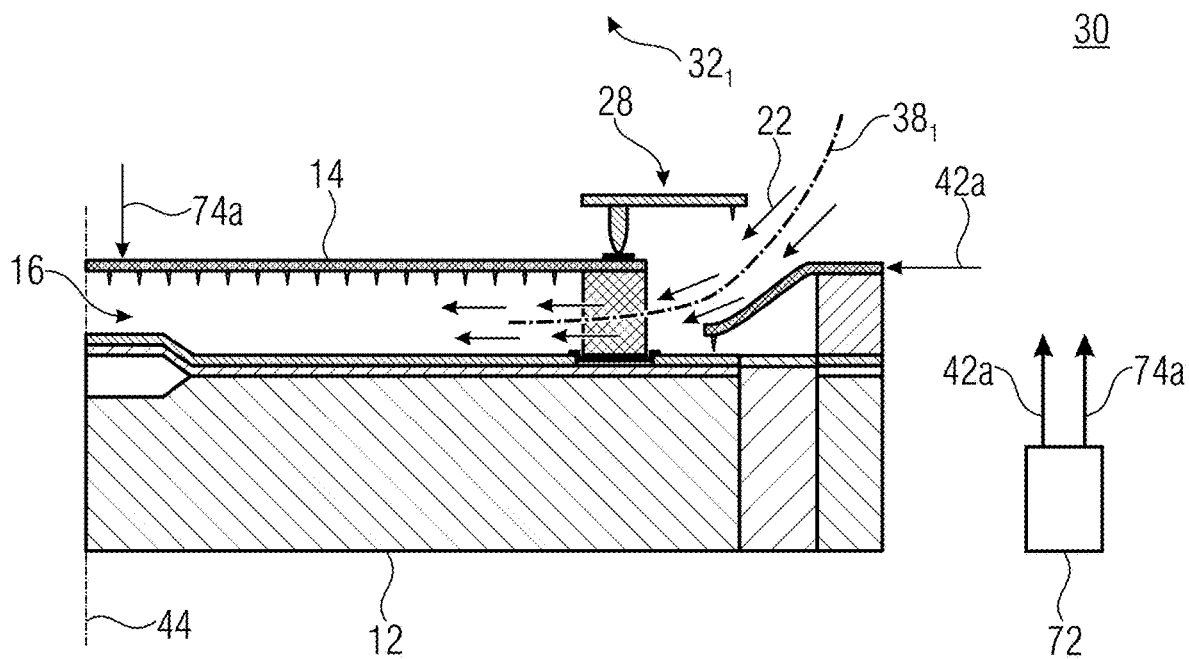

In a further or subsequent state being shown in FIG. 4c, the control unit 72 may be configured for maintaining the status of the valve structure 28 whilst providing the control signal 74a to the membrane structure 14 so as to increase the volume of the pump chamber 16, thereby leading the fluid 22 to travel from the outer volume $32_1$ into the pump chamber 16. For example, the membrane structure 14 may be released to be unactuated such that a restoring force may be used to enlarge the volume of the pumping chamber 16 again. Alternatively, the membrane structure may actively be moved into the position with increased distance to the basis structure 12. That is, the control unit 72 is configured for controlling the MEMS pump 30 so as to perform a sucking cycle. When start sucking, the valve structure may already be in a state having opened the fluidic path $38_1$, thereby preventing a requirement for energy to passively mechanically switch a valve when generating a vacuum in the pump chamber 16.

Figure 4D:
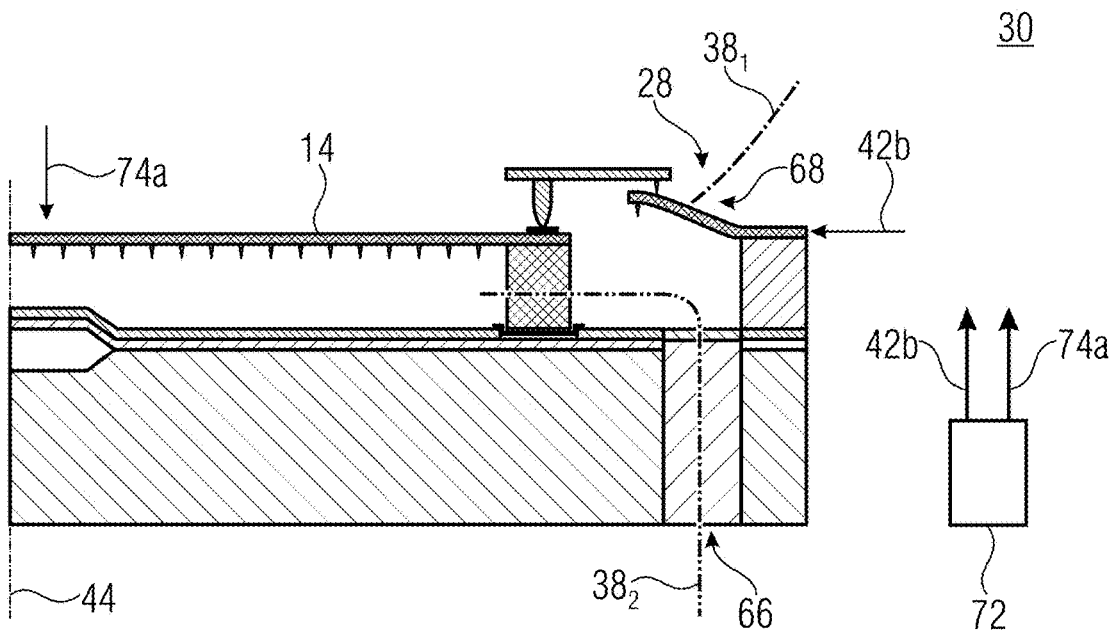

In a further or subsequent state being shown in FIG. 4d, the control unit 72 may be configured for providing again the control signal 42b to the valve structure 28 so as to open the fluidic path $38_2$ again whilst blocking the fluidic path $38_1$. That is, the exhaust 66 is opened while the intake 68 may be blocked or closed. Meanwhile, the control unit 72 may be configured for maintaining the control signal 74a to the membrane structure 14.

Figure 4E:
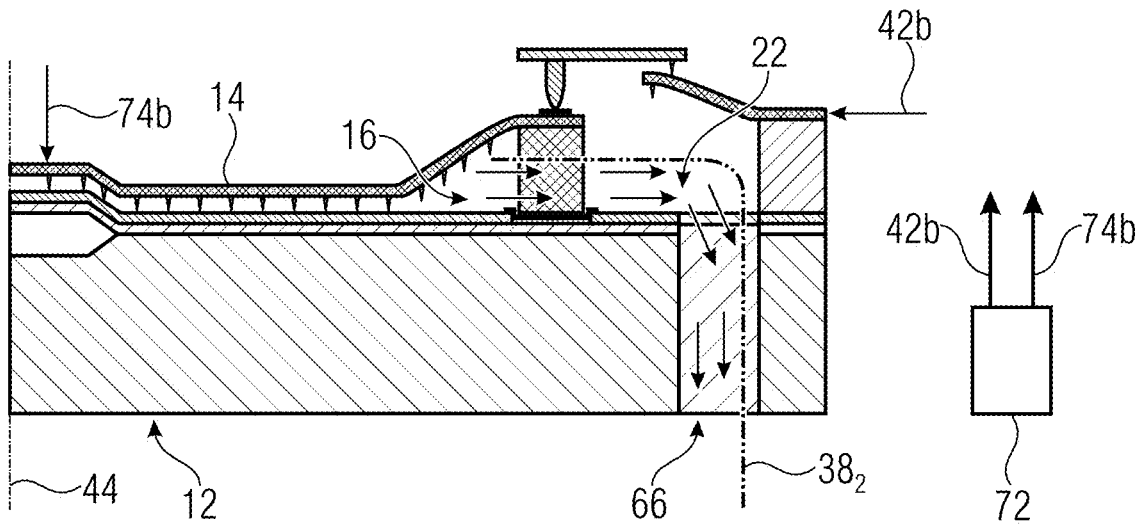

In a further or subsequent state shown in FIG. 4e the control unit 72 may be configured for providing again the control signal 74b to the membrane structure 14 thereby generating a pumping cycle by leading the membrane structure 14 to move towards the basis structure 12, thereby reducing the volume of the pumping chamber 16. This may lead to a travel of the fluid 22 along the fluidic path $38_2$ through the exhaust 66. Thereby, a state according to FIG. 4a may be obtained.

Figure 4F:
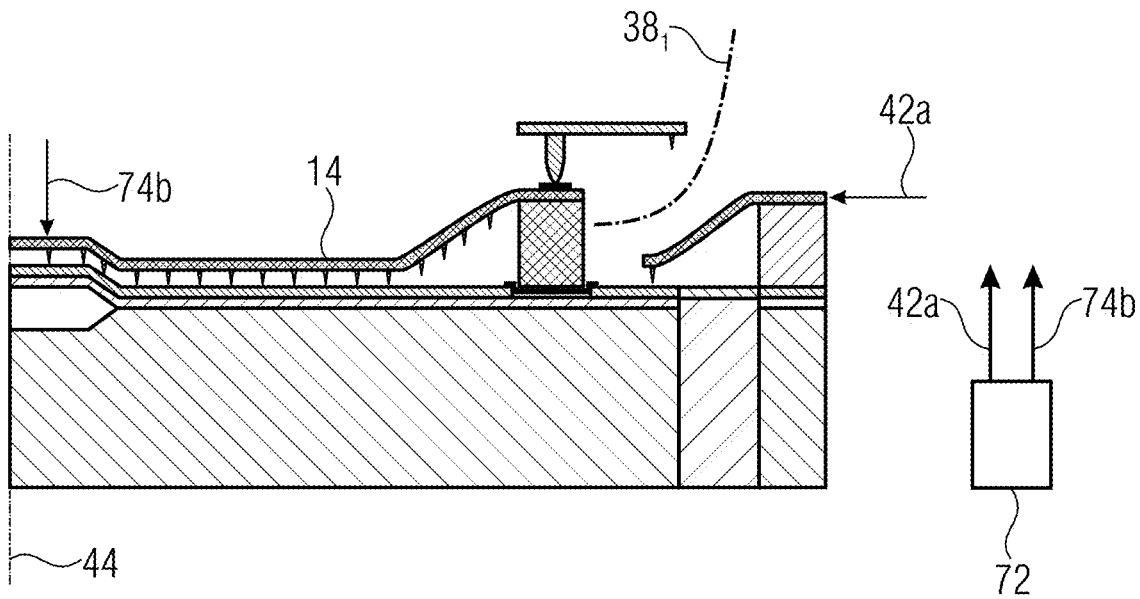

In a further or subsequent state shown in FIG. 4f, the control unit 72 may be configured for maintaining the position of the membrane structure 14 whilst changing to the control signal 42a so as to open the fluidic path $38_1$ again as described in connection with FIG. 4b.

That is, the control unit 72 may be configured for providing the above control signal 42a to control the valve structure 28 to open the fluidic path $38_1$ to the outer volume $32_1$ and to block the fluidic path $38_2$ to the outer volume $32_2$. The control unit may be configured for providing the pump control signal 74a and/or 74b to the membrane structure 14 and/or the basis structure 12 so as to change the volume of the pump chamber 16. The change may be an increase or a decrease. Thereafter, i.e., after the fluid has traveled to or from the pump chamber, the control unit may be configured for providing a different valve control signal 42b so as to block the path $38_1$ and to open the fluidic path $38_2$. The control unit may be configured for providing a pump control signal such as the pump control signal 74b so as to inversely change the volume of the pump chamber.

A direction along which the fluid 22 is pumped and/or a functionality of the intake or exhaust may thus be controlled or at least influenced based on a movement of the membrane structure 14 with respect to the basis structure 12, i.e., which fluidic path is opened or blocked during the sucking cycle or the pumping cycle. Although the intake 68 and the exhaust 66 are illustrated as being out of plane with respect to the MEMS pump 30, the exhaust 66 and/or the intake 68 may also be arranged in-plane, for example, using different openings in the structure of the MEMS pump 30.

Although the control signal 74a and the control signal 74b are illustrated as being applied to the membrane structure 14, based on different actuating principles or different configurations of a working electrode and a counter electrode, the control signal may alternatively or additionally be applied to further or other elements such as a piezoelectric element or other electrodes. Accordingly, the control signal 42a and/or 42b may be applied to different electrodes or elements that cause for a suitable actuation of the valve structure 28.

That is, the status of the valve structure 28 may be actively controlled. When compared to passive valve structures, this may allow to open and/or close fluidic paths prior to actuating or changing the volume of the pump chamber so as to allow for short pump cycles and/or a high efficiency as generating pumping or sucking forces that open valve structures may be omitted. That is, the control unit 72 may be used to synchronize the operation of the valve structure 28 with the movement of the membrane structure 14 in an active manner. As prior to moving the membrane structure 14 the valve structure 28 may be brought into a requested or desired position.

In other words, first a membrane may be pulled towards the bottom backplate which may be referred to as a starting position (FIG. 4a). Second, the membrane may be pulled towards the bottom backplate, the intake may be opened and the exhaust may be closed (FIG. 4b). Third, the membrane may be released to its idle position such that air or liquid (fluid) is soaked in (FIG. 4c). Fourth, the membrane may still be in the idle position, the exhaust may be opened and the intake may be closed (FIG. 4d). Fifth, the membrane may be pulled towards the bottom back plate such that the air or liquid is forced towards the exhaust (FIG. 4e). Sixth, the membrane may be pulled towards the bottom backplate, the exhaust may be closed and the intake may be opened (FIG. 4f). Alternatively, intake and exhaust can be exchanged (pumping cycle can be adjusted accordingly) alternatively or in addition, the pumping principle can be applied as in-plane/in-plane pump or in-plane/out-of-plane pump by defining the exhaust direction.

Figure 5A:
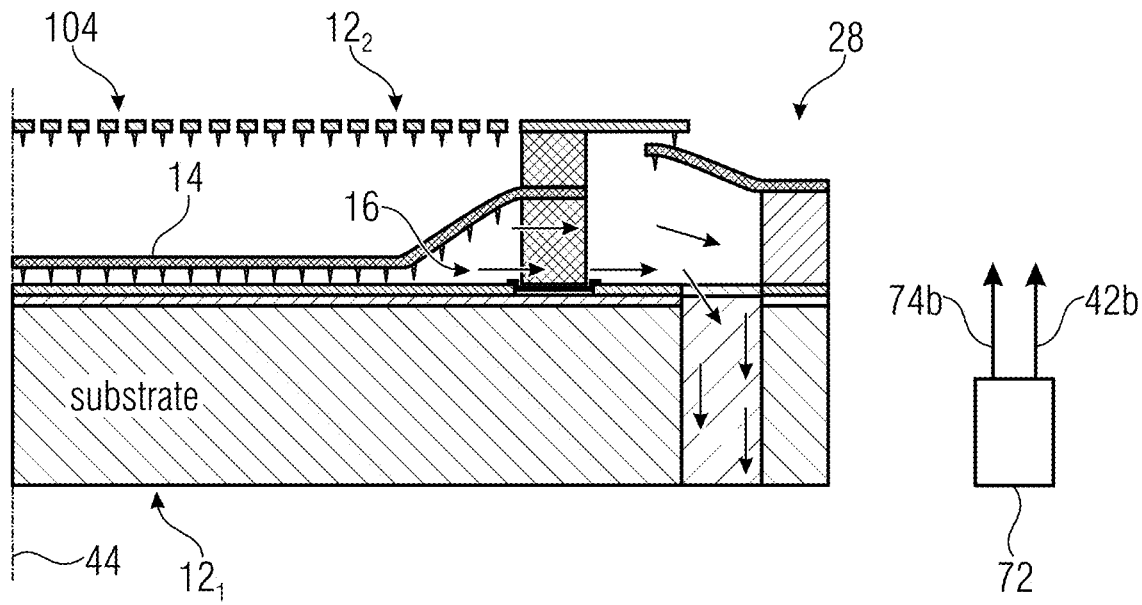
FIGS. 5a-5d show schematic side views of a pumping cycle of a further MEMS pump according to an embodiment.

FIGS. 5a-5d show schematic side views of a pumping cycle of a MEMS pump 50 according to an embodiment. The explanations given in connection with FIGS. 4a-4f apply to the MEMS structure 50 accordingly. When compared to the MEMS structure 30 the MEMS structure 50 comprises an additional basis structure $12_2$, wherein a basis structure $12_1$ may be formed according to the basis structure 12 of MEMS pump 30. The additional basis structure $12_2$ may comprise a low fluidic resistance, for example, it may comprise openings 104. The membrane structure 14 being arranged between the basis structures $12_1$ and $12_2$ may thus face a low fluidic resistance when moving towards the basis structure $12_2$. The basis structure $12_2$ may form a mechanical limitation for a deflection of the membrane structure 14 when moving away from the basis structure $12_1$. Optionally, the basis structure $12_2$ may comprise an electrode element that may be used to generate attracting forces between the membrane structure 14 and the basis structure $12_2$. This may allow to increase the volume of the pumping chamber 16 when compared to the MEMS pump 30 as the membrane structure 14 is not only released to a plane or possibly undeflected state but may be deflected in an opposing direction. The control of the volume of the pump chamber 16 and the valve structure 28 may be in accordance with the pump cycle being described in connection with MEMS pump 30. In FIG. 5a, a pump cycle may be obtained based on the control signals 74b and 42b.

Figure 5B:
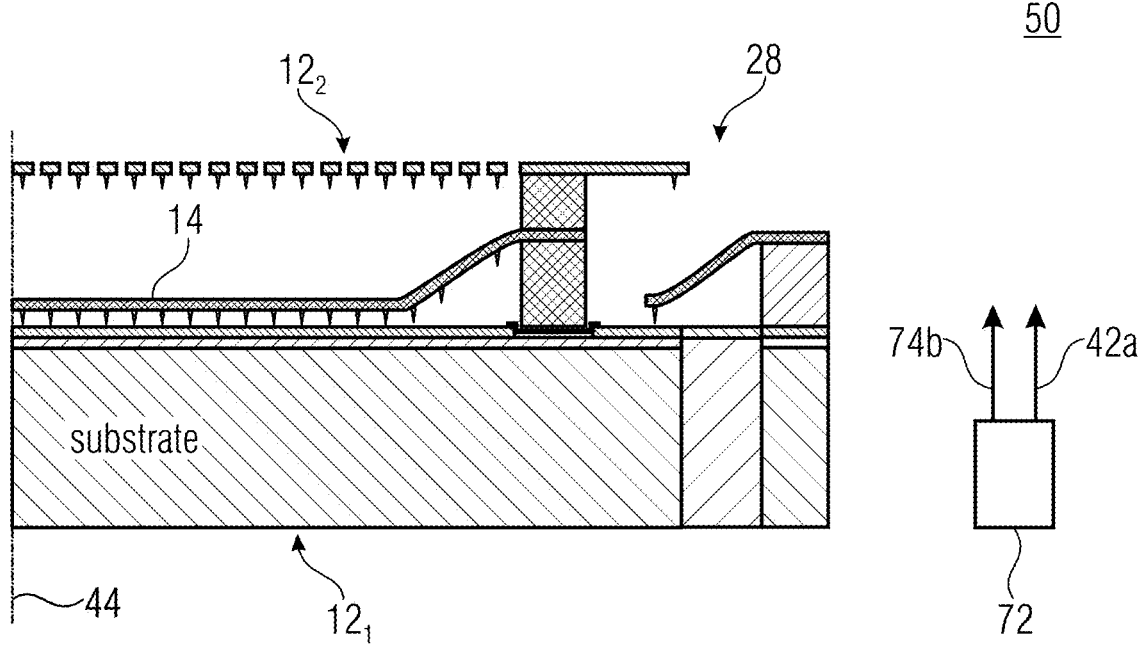

In FIG. 5b, a switch of the state of the valve structure 28 may be seen when changing from the control signal 42b to the control signal 42a such that different fluidic paths are blocked and/or opened.

Figure 5C:
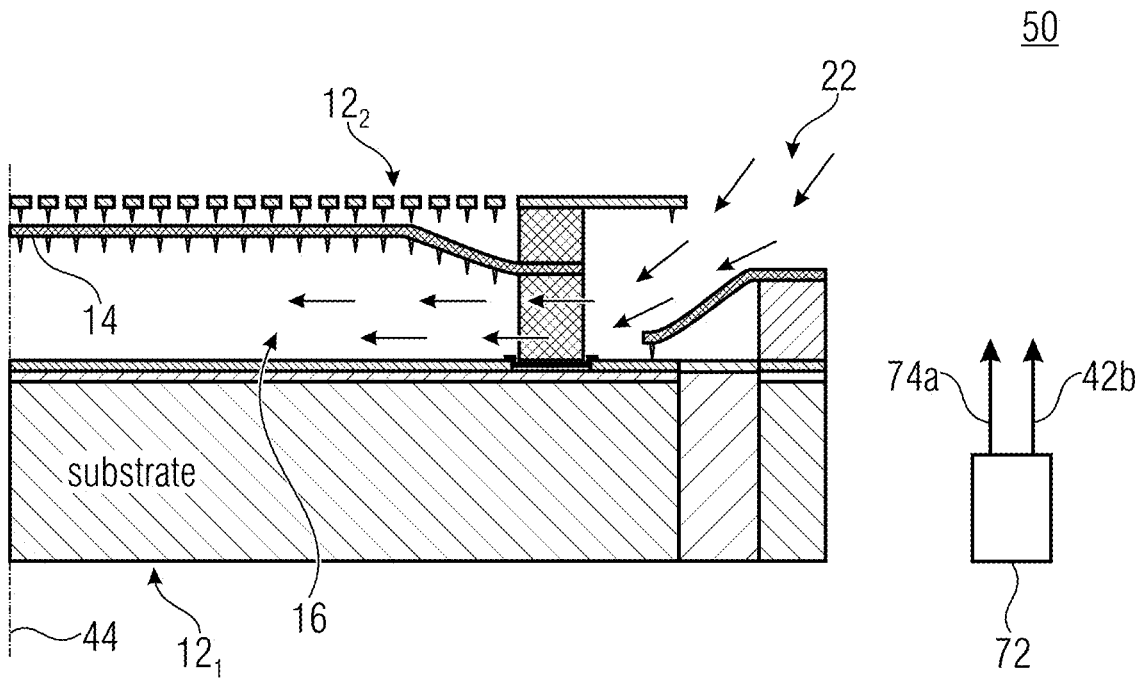

In FIG. 5c a change to the control signal 74a may lead to a deflection of the membrane structure 14 so as to increase the volume of the pump chamber 16 such that an intake of the fluid 22 into the pump chamber 16 appears.

Figure 5D:
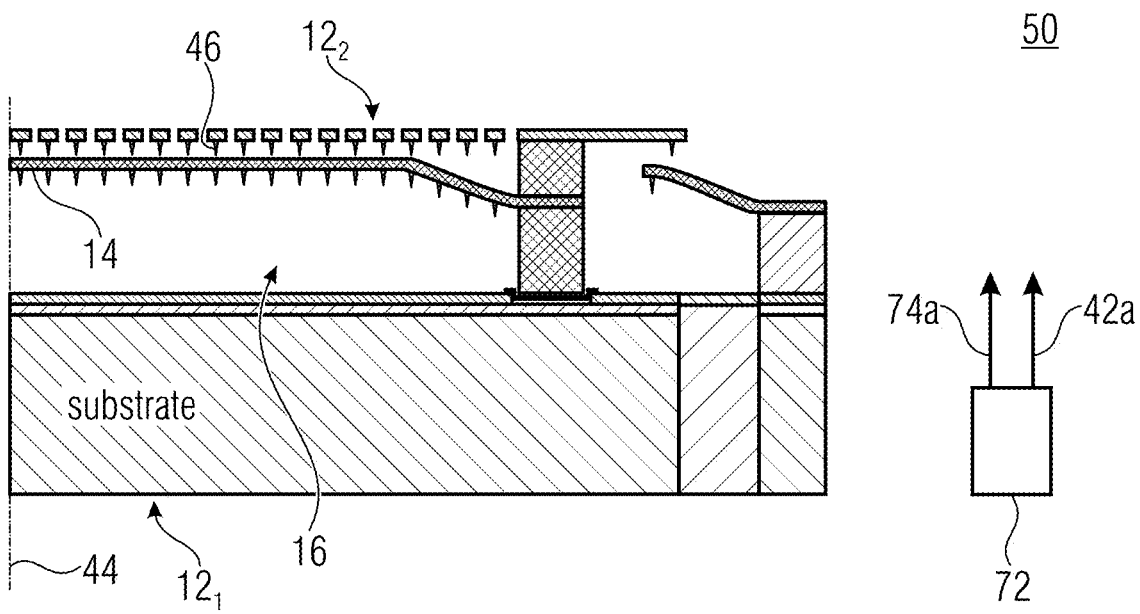

In FIG. 5d another switching process is illustrated when changing to the control signal 42a so as to again change the path which is opened and/or closed. Afterwards, another pumping cycle may be started or generated by controlling the MEMS pump 50 in accordance with the explanations given in FIG. 5a. Independent from the further basis structure $12_2$ the MEMS pump 50 may be obtained without the local tapering 76.

Anti-stiction bumps 46 may also be arranged between the basis structure $12_2$ and the membrane structure 14, for example, when being arranged at the membrane structure 14 and/or at the basis structure $12_2$.

That is, a first potential between the basis structure $12_1$ and the membrane structure 14 may lead to a decrease of the volume of the pump chamber 16, wherein a potential between the basis structure $12_2$ and the membrane structure 14 may lead to an increase of the volume of the pump chamber 16.

Figure 6:
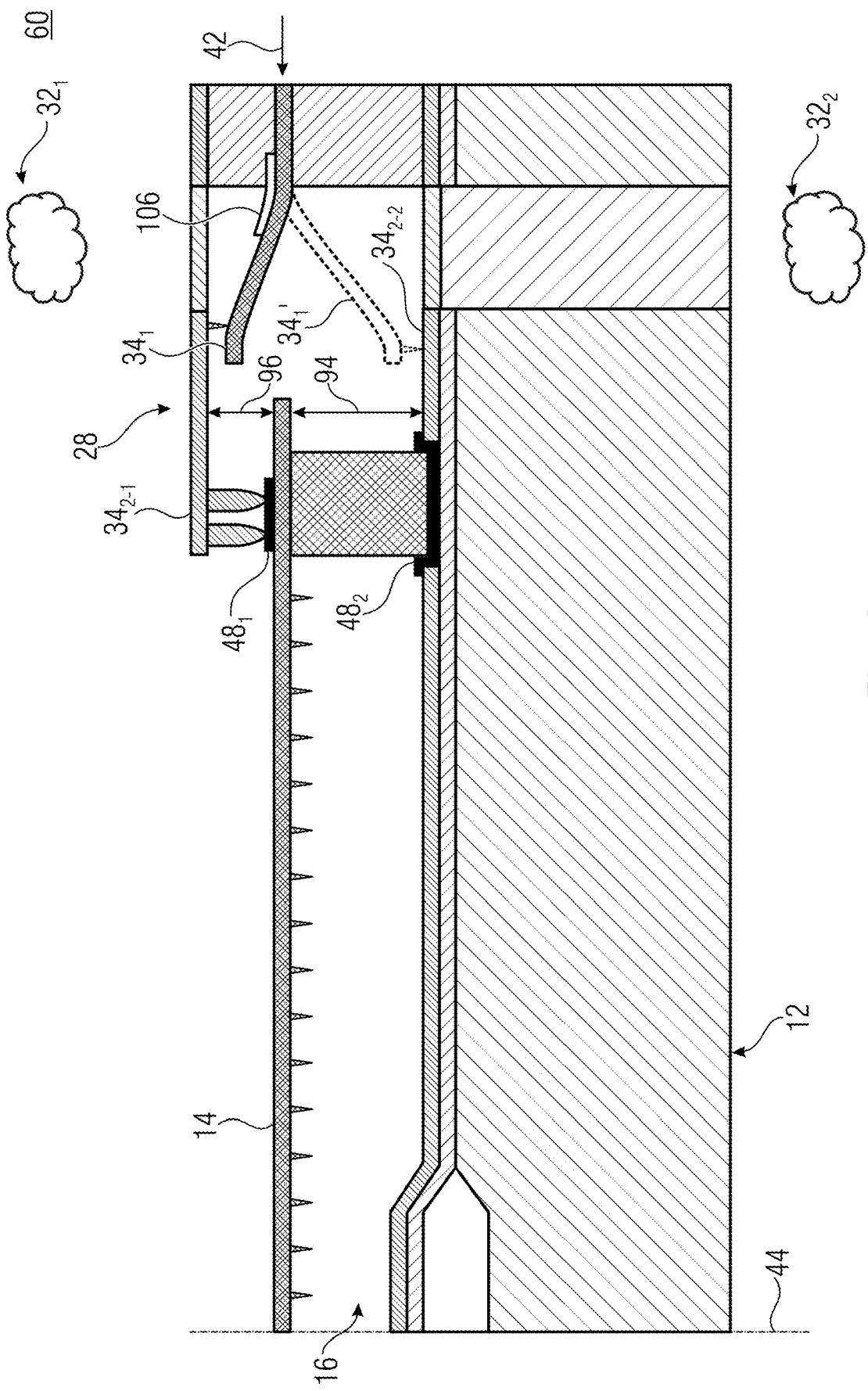
FIG. 6 shows a schematic side view of a part of a MEMS pump according to an embodiment having a prestraining element as part of the valve structure.

FIG. 6 shows a schematic side view of a part of a MEMS pump 60 according to an embodiment that may comprise a structure essentially corresponding to the structure of the MEMS pump 30. When compared to the MEMS pump 30, the portion $34_1$ may comprise a prestraining element 106 configured for applying a mechanical prestrain to the portion $34_1$ so as to deflect the portion $34_1$ when compared to the undeflected state illustrated in FIG. 3a. That is, when compared to an unactuated state of MEMS pump 30, an electric passage actuation or prestraining may be included. The prestraining element 106 may be configured for deflecting the portion $34_1$ in an unactuated state of the MEMS pump 60 so as to block either the path between the pump chamber 16 and the outer volume $32_1$ or the path between the pump chamber 16 and the outer volume $32_2$. This allows to use only one actuating signal 42 so as to switch between the states of the valve structure 28. Although this may lead to higher signal amplitudes as the force of the prestraining element has to be naturalized, this may allow for a simple controlling. That is, although FIG. 6 is illustrated as having the prestraining element 106 in a configuration in which the path to the outer volume $32_1$ is blocked in an unactuated state, i.e., signal 42 is off or is 0 volt or the like, and the deflection $34_1$ is obtained by having an actuation of the element $34_1$ so as to block the path between the pump chamber 16 and the outer volume $32_2$, the prestraining element 106 may be adapted inversely.

Alternatively or in addition to arranging the prestraining element 106 at the portion $34_1$ a prestraining element may be arranged at a different location, for example, at the portion $34_2$, for example, at the part $34_{2-1}$ and/or $34_{2-2}$ so as to obtain one of the states that are actively generated in the description relating to MEMS pump 30 and 50 in a passive way.

FIG. 7 shows a schematic flow chart of a method 700 according to an embodiment which may be used for MEMS pump described herein but also for other MEMS pumps that possibly have the passage being arranged out of plane. That is, for performing the method it is not necessary to have the passage being arranged in-plane. The method is directed to having a valve structure which is actively controllable. Therefore, a MEMS pump to be controlled with the method 700 may comprise a basis structure and a membrane structure opposing the basis structure and being deflectable along a direction towards the basis structure, for example, the direction 24. The MEMS pump may comprise a pump chamber between the basis structure and the membrane structure and a passage configured for letting pass a fluid to the pump chamber and from the pump chamber, i.e., for letting pass a fluid into the pump chamber or to exit the pump chamber. The MEMS pump may comprise a valve structure fluidically coupled to the passage and configured for connecting, in a first state, the passage to a first outer volume so as to provide the fluid to the pump chamber and for connecting, in a second state, the passage to a second outer volume so as to provide the fluid to the second outer volume. The valve structure may be controllable by actuation using a control signal. The method 700 may comprise a step 700 for controlling the valve structure to open a first path to the first outer volume and to block a second path to the second outer volume. The method 700 may comprise a step 720 for providing a first pump control signal to the membrane structure so as to change a volume of the pump chamber. A step 730 may be used for providing a second valve control signal to the valve structure to control the valve structure to block the first path and to open the second path after the volume of the pump chamber has changed. A step 740 may comprise providing a second pump control signal so as to inversely change the volume of the pump chamber. Steps 720 and 740 may be performed such that once the fluid travels into the pump chamber and travels once out of the pump chamber.

The MEMS pumps according the described embodiments may be a part or subpart (component) of a system, for example, a Photo Acoustic Spectrometer (PAS Sensor) or a particular sensor. Micro-pumps described herein may also be used, for example, for medical or chemical applications, for example, in-situ analysis, micro-reactors, a pumping of a defined minute dose of pharmaceuticals, etc. Embodiments may allow for a speed up (reduction of measurement time/diffusion time) for sensors developed due to active liquid gas transportation. Alternatively, it may also be a discreet, separate or own product/system as micro-pump. Embodiments propose the placement of both, inlet and outlet valve, surrounding the central pumping chamber to reduce the fluidic resistance by increasing inlet and outlet cross-section area. Embodiments also include the usage of a valve membrane that is shared between inlet and outlet and can close both valve sides alternatively. Other micro-pumps may suffer from high fluidic resistances at inlet and/or outlet valves based on real logical forces on these fluids. An active valve control according to embodiments and/or an active valve which is synchronized with the membrane movement and position allows for an efficient MEMS-pump.

In other words, embodiments related to a micro-pump with a pure in-plane operation (wherein the outer volumes are arranged in-plane) or an in-plane operation combined with an out-of-plane operation. A central pumping chamber with a pumping membrane or diaphragm which is surrounded by a valve forming an inlet and/or outlet is described. The inlet and/or outlet is behaving in a three way characteristic and is surrounding the diaphragm or membrane. Liquids and/or gasses i.e., fluids, are transferred by the help of a diaphragm/membrane through a pre-defined path from an inlet towards an outlet based on the force applied from the diaphragm/membrane. The total micro-pump may comprise an overall thickness of a few micrometers and may be smaller than a few millimeters laterally. The actuation of the diaphragm/membrane may be implemented via electrostatics, piezo or electrodynamics. MEMS implementations may mostly use electrostatics or piezo actuation.

A flat two way micro-pump design based on diaphragm/membrane movement is described. Small and thin enough to be integrated into MEMS sensor solutions (also monolithic integration is possible) is obtained. The micro-pump may be produced on a single wave using a semiconductor manufacturing process.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The above described embodiments are merely illustrative for the principles of the present invention. It is understood that modifications and variations of the arrangements and the details described herein will be apparent to others skilled in the aft. It is the intent, therefore, to be limited only by the scope of the impending patent claims and not by the specific details presented by way of description and explanation of the embodiments herein.

What is claimed is:

1. A MEMS pump comprising:
   a basis structure;
   a membrane structure opposing the basis structure and being deflectable parallel to a surface normal of the basis structure;
   a pump chamber between the basis structure and the membrane structure, wherein a volume of the pump chamber is based on a position of the membrane structure with respect to the basis structure;
   a passage configured for letting a fluid pass into the pump chamber or exit the pump chamber, wherein the passage is arranged in-plane with respect to the pump chamber; and
   a valve structure fluidically coupled to the passage and configured for connecting, in a first state, the passage to a first outer volume so as to provide the fluid to the pump chamber and for connecting, in a second state, the passage to a second outer volume so as to provide the fluid to the second outer volume,
   wherein the valve structure comprises a first portion, and a second portion, wherein a relative position of the first portion and the second portion is variable, and wherein the valve structure is configured for intermittently fluidically blocking in different states a path to one of the first and the second outer volume responsive to a control signal provided to the valve structure,
   wherein a lip structure is arranged at the first portion and configured for abutting the second portion so as to fluidically block the path; or wherein the lip structure is arranged at the second portion and configured for abutting the first portion so as to fluidically block the path, and
   wherein the lip structure is a first lip structure; wherein the valve structure comprises a second part of the second portion; wherein the first portion is arranged between a first part of the second portion and the second part of the second portion, the valve structure comprising a second lip structure between the first portion and the second part of the second portion; and wherein the valve structure is configured for alternately connecting the first portion with the first part via the first lip structure and with the second part via the second lip structure.

2. The MEMS pump according to claim 1, wherein at least one of the first portion or the second portion is configured for being deflectable based on at least one of an electrostatic force, a piezoelectric effect, and an electrodynamic actuation.

3. The MEMS pump according to claim 1, wherein the first portion is deflectable with respect to the second portion, wherein the first portion comprises a prestraining element configured for applying a mechanical prestrain to the first portion so as to deflect the first portion; and/or
   wherein the second portion is deflectable with respect to the first portion, wherein the second portion comprises a prestraining element configured for applying a mechanical prestrain to the second portion so as to deflect the second portion.

4. The MEMS pump according to claim 1, wherein the first portion is arranged at least partially in a plane of the membrane structure and comprises a same material when compared to the membrane structure, and/or wherein the second portion is arranged at least partially in a same plane as the basis structure and comprises a same material when compared to the basis structure.

5. The MEMS structure according to claim 1, wherein the lip structure is formed as a circumferential anti-stiction bump surrounding the pump chamber.

6. The MEMS structure according to claim 1, wherein the valve structure surrounds the membrane structure.

7. The MEMS structure according to claim 1, wherein the path includes a first path to the first outer volume and a second path to the second outer volume, and wherein the MEMS structure further comprises a control unit configured for:
    providing a first valve control signal to the valve structure to control the valve structure to open the first path to the first outer volume and to block the second path to the second outer volume;
    providing a first pump control signal to the membrane structure and/or the basis structure so as to change a volume of the pump chamber;
    providing a second valve control signal to the valve structure to control the valve structure to block the first path and to open the second path after the volume of the pump chamber has changed; and
    providing a second pump control signal to the membrane structure and/or the basis structure so as to inversely change the volume of the pump chamber.

8. The MEMS pump according to claim 1, wherein the passage is formed as a circumferential structure comprising a plurality of pillars spacing the membrane structure from the basis structure and surrounding the pump chamber.

9. The MEMS pump according to claim 1, comprising a local tapering in a center portion of the pump chamber, the tapering protruding towards the membrane structure to locally reduce a distance between the basis structure and the membrane structure, wherein based on a deflection of the membrane structure so as to reduce a volume of the pump chamber, a mechanical contact between the basis structure and the membrane structure is first obtained in the center portion and afterwards in a surrounding portion surrounding the center portion and/or wherein based on a deflection of the membrane structure so as to increase the volume of the pump chamber, a mechanical contact between the basis structure and the membrane structure is first released in the surrounding portion and afterwards in the center portion.

10. The MEMS pump according to claim 1, wherein the basis structure is a first basis structure, the MEMS pump comprising a second basis structure, wherein the membrane structure is arranged between the first basis structure and the second basis structure; wherein the MEMS pump is configured for decreasing a volume of the pump chamber based on a first potential between the first basis structure and the membrane structure and for increasing the volume of the pump chamber based on a second potential between the second basis structure and the membrane structure.

11. The MEMS pump according to claim 1 comprising anti-stiction bumps between the membrane structure and the basis structure.

12. A method for operating a MEMS pump comprising a basis structure; a membrane structure opposing the basis structure and being deflectable along a direction towards the basis structure; a pump chamber between the basis structure and the membrane structure; a passage configured for letting a fluid pass into the pump chamber or exit the pump chamber; and a valve structure fluidically coupled to the passage and configured for connecting, in a first state, the passage to a first outer volume so as to provide the fluid to the pump chamber and for connecting, in a second state, the passage to a second outer volume so as to provide the fluid to the second outer volume, the method comprising:
    controlling the valve structure to open a first path to the first outer volume and to block a second path to the second outer volume;
    providing a first pump control signal so as to change a volume of the pump chamber;
    controlling the valve structure to block the first path and to open the second path after the volume of the pump chamber has changed;
    providing a second pump control signal so as to inversely change the volume of the pump chamber,
    wherein the valve structure comprises a first portion including a first lip structure, and a second portion including a second lip structure, and wherein a relative position of the first portion and the second portion is variable, and wherein the first portion is arranged between a first part of the second portion and a second part of the second portion, and the second lip structure is arranged between the first portion and the second part of the second portion, and
    controlling the valve structure to alternately connect the first portion with the first part of the second portion via the first lip structure by abutting the first lip structure with the first part of the second portion and connect the first portion with the second part of the second portion via the second lip structure by abutting the second lip structure with the second part of the second portion.

13. A MEMS pump comprising:
    a basis structure;
    a membrane structure opposing the basis structure and being deflectable parallel to a surface normal of the basis structure;
    a pump chamber between the basis structure and the membrane structure, wherein a volume of the pump chamber is based on a position of the membrane structure with respect to the basis structure;
    a passage configured for letting a fluid pass into the pump chamber or exit the pump chamber, wherein the passage is arranged in-plane with respect to the pump chamber;
    a valve structure fluidically coupled to the passage and configured for connecting, in a first state, the passage to a first outer volume so as to provide the fluid to the pump chamber and for connecting, in a second state, the passage to a second outer volume so as to provide the fluid to the second outer volume, wherein the valve structure comprises a first portion and a second portion; and
    a lip structure between the first portion and the second portion;
    wherein the lip structure is arranged at the first portion and configured for abutting the second portion so as to fluidically block the passage or wherein the lip structure is arranged at the second portion and configured for abutting the first portion so as to fluidically block the passage;
    wherein the lip structure is a first lip structure;
    wherein the valve structure comprises a second part of the second portion;
    wherein the first portion is arranged between a first part of the second portion and the second part of the second portion, the valve structure comprising a second lip structure between the first portion and the second part of the second portion; and wherein the valve structure is configured for alternately connecting the first portion with the first part via the first lip structure and with the second part via the second lip structure.

\* \* \* \* \*

UNITED STATES PATENT AND TRADEMARK OFFICE
CERTIFICATE OF CORRECTION

| | |
|---|---|
| PATENT NO. | : 11,835,041 B2 |
| APPLICATION NO. | : 16/922530 |
| DATED | : December 5, 2023 |
| INVENTOR(S) | : Martin Seidl |

It is certified that error appears in the above-identified patent and that said Letters Patent is hereby corrected as shown below:

In the Claims

Claim 5, Column 15, Line 6; delete "structure" and insert --pump--.

Claim 6, Column 15, Line 9; delete "structure" and insert --pump--.

Claim 7, Column 15, Line 11; delete "structure" and insert --pump--.

Signed and Sealed this
Twentieth Day of February, 2024

Katherine Kelly Vidal
*Director of the United States Patent and Trademark Office*